Figure 1:
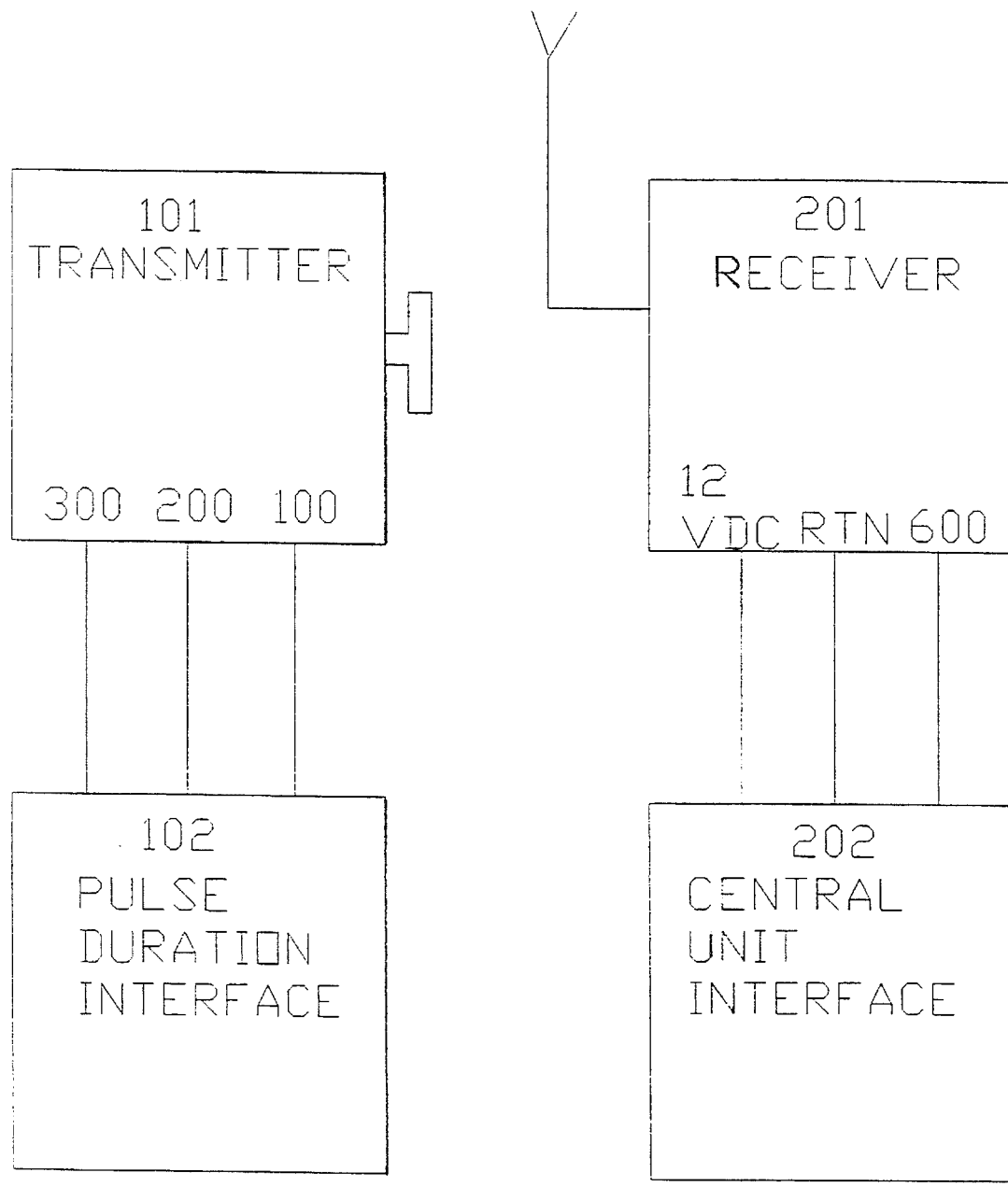

United States Patent [19]

Dortenzio et al.

[11] Patent Number: 5,459,448
[45] Date of Patent: Oct. 17, 1995

[54] AUTOMOTIVE CONTINUOUS PROTECTION ANTI-THEFT SYSTEM

[76] Inventors: Christopher J. Dortenzio, 24 Adams Dr., Huntington; Brian H. Twohig, 153 Okenuck Way, Shelton, both of Conn. 06484

[21] Appl. No.: 265,828

[22] Filed: Jun. 27, 1994

[51] Int. Cl.⁶ ................................................ B60R 25/10
[52] U.S. Cl. ........................ 340/426; 180/287; 307/10.2
[58] Field of Search ................................. 340/426, 430, 340/428, 429, 825.31, 825.72; 180/287; 307/10.2, 10.3

[56] References Cited

U.S. PATENT DOCUMENTS

| | | | |
|---|---|---|---|
| 4,754,255 | 6/1988 | Sanders et al. | 340/430 |
| 4,835,518 | 5/1989 | Hwang | 340/426 |
| 4,924,206 | 5/1990 | Ayers | 340/426 |
| 4,931,664 | 6/1990 | Knoll | 340/426 |
| 5,280,267 | 1/1994 | Reggiani | 340/426 |
| 5,349,329 | 9/1994 | Smith | 340/426 |

FOREIGN PATENT DOCUMENTS

| | | | |
|---|---|---|---|
| 2423015 | 12/1979 | France | 340/426 |
| 2233487 | 1/1991 | United Kingdom | 340/426 |

*Primary Examiner*—Brent Swarthout

[57] ABSTRACT

An automotive security device of the type consisting of: (a) a portable unit and (b) a central unit. The portable unit consisting of a transmitter circuit and a pulse duration circuit being capable of transmitting specified signal pulses at periodic intervals over a limited distance. The central unit, which is mounted in the vehicle, consisting of a receiver circuit and an interface circuit being capable of receiving these signals and activating the vehicle electrical system upon receiving said signal and deactivating the vehicle electrical system upon the absence of said signal.

1 Claim, 6 Drawing Sheets

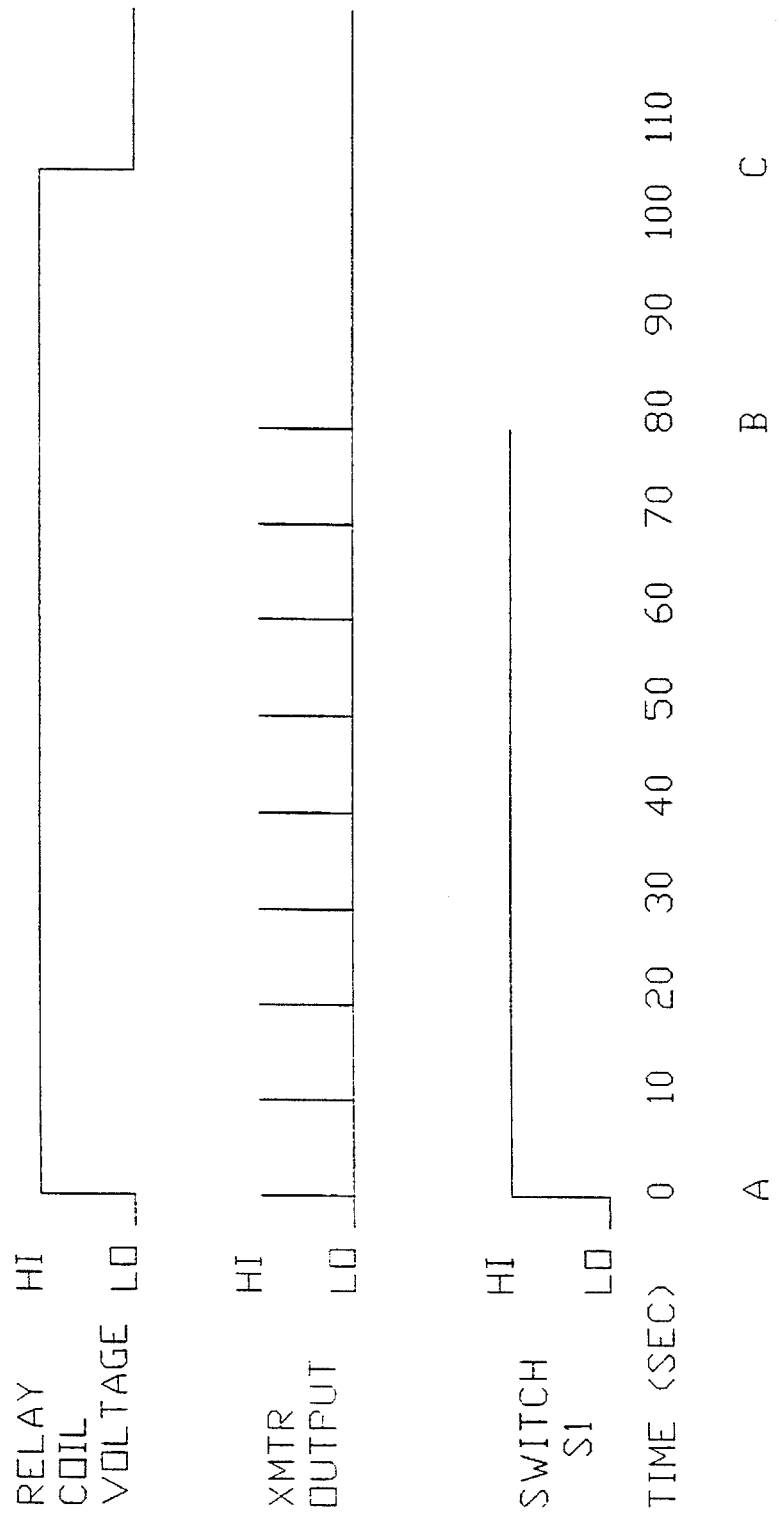

AUTOMOTIVE CONTINUOUS PROTECTION ANTI-THEFT SYSTEM

BACKGROUND—FIELD OF INVENTION

This invention relates to vehicle anti-theft devices, particularly to such devices which utilize a transmitter and receiver unit.

BACKGROUND—DESCRIPTION OF PRIOR ART

Heretofore, automobile anti-theft security devices consisted of:

A receiver unit mounted in the vehicle and powered by the vehicle battery. This unit being capable of receiving a specific signal from a transmitter device.

2) A control unit, also mounted in the vehicle, capable of enabling or disabling the vehicles engine, this being a function of the transmitted signal.

3) A portable, self contained transmitter unit used for activating the vehicle mounted unit.

By pressing a button on the portable unit, the user sends a signal, usually in the form of a specifically tuned frequency or group of frequencies, or a pulse duration transmission, which is received by the vehicle mounted unit. This signal, or series of signals, being received by the vehicle mounted unit, then activates or deactivates a device which blocks the operation of the vehicle engine.

Other systems are known which utilize a passive transmitter and receiver system where the vehicle mounted unit as well as the portable unit have a transmitter and a receiver. The portable unit will only transmit if the portable unit first receives a signal from the vehicle mounted unit. A series of signals are interchanged resulting in the activation or deactivation of the device which blocks the operation of the vehicles engine.

With these systems, once the vehicle mounted unit is activated or deactivated and the vehicle engine is enabled no other interaction takes place between the portable unit and the vehicle mounted unit.

It then becomes possible for potential thieves to take advantage of this situation by waiting for the vehicles engine to be enabled.

There are systems known that can disable the vehicle after the engine is enabled, but there must be an interaction between this device and the vehicle operator to occur. Therefore, if the vehicle's engine is enabled and the vehicle operator is surprised by an attacker or becomes incapacitated in any way by the potential thieves before activating this device, the device becomes ineffective in deterring the crime. Also, in the case of transmitter disabling devices, if the vehicle mounted unit becomes out-of-range of the portable unit, the portable unit becomes useless in disabling the vehicle.

OBJECTS AND ADVANTAGES

Accordingly, the objects and advantages of this invention are:

(a) to provide a fully automatic anti-theft security device which is totally independent of the actions of the vehicle operator.

(b) to provide an anti-theft security device which will continuously protect the vehicle.

(c) to change the proximity of the portable unit to the vehicle mounted unit from a liability to an asset.

Still further objectives and advantages will become apparent from the consideration of the ensuing description and drawings.

DRAWING FIGURES

FIG. 1. is the block diagram for the entire device.

Figure 2:
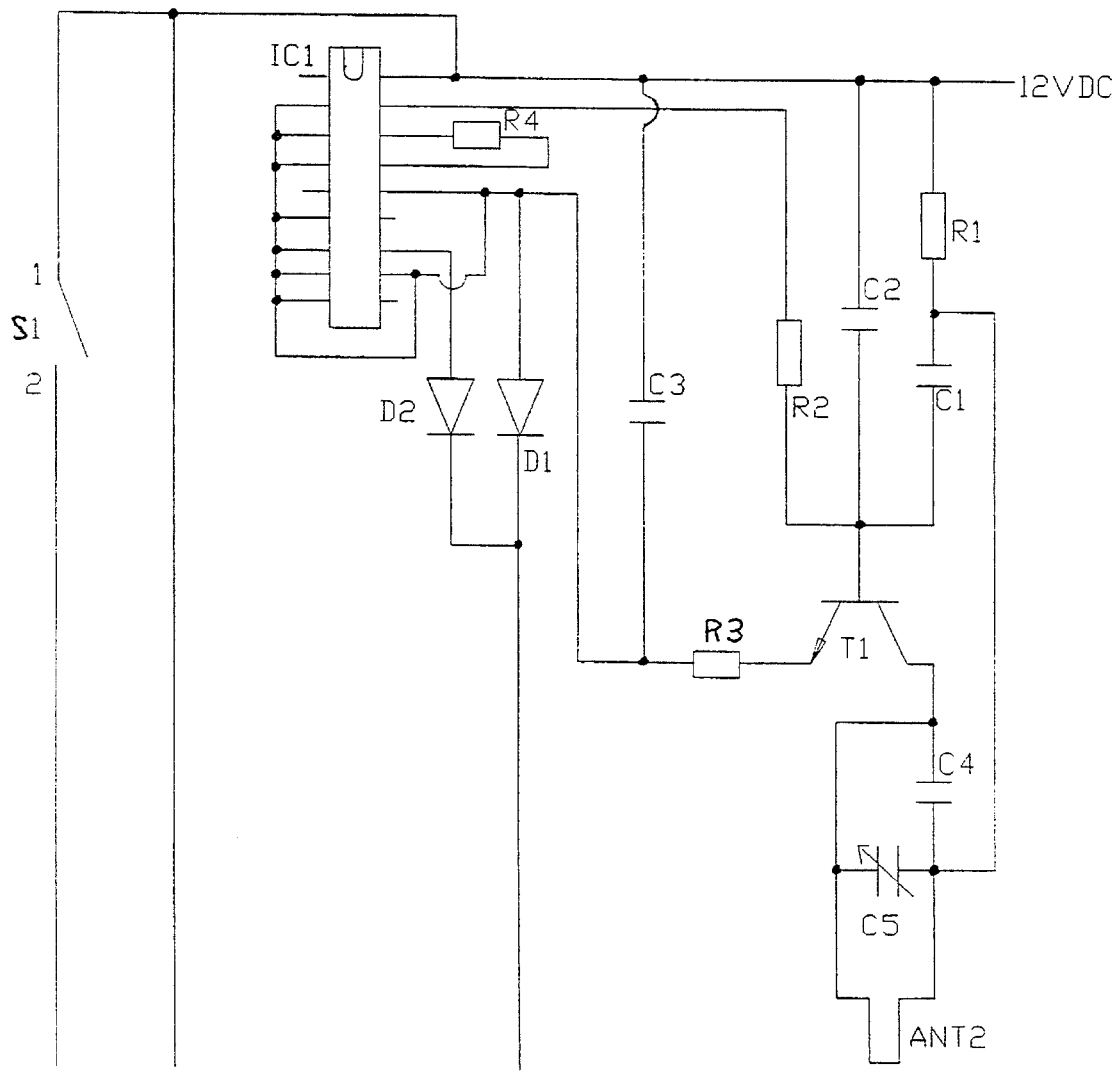

FIG. 2. is the schematic for the portable unit transmitter section.

Figure 3:
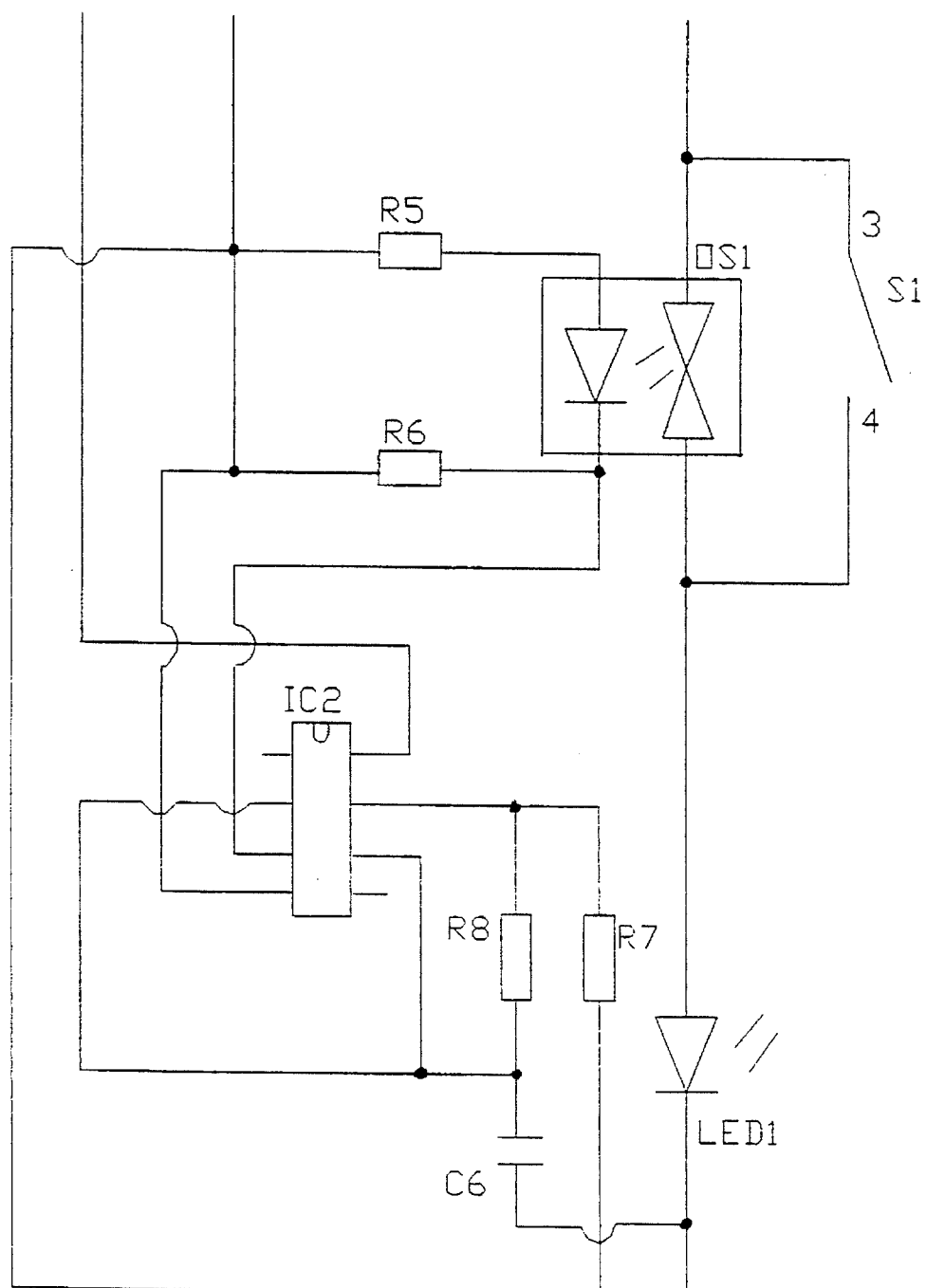

FIG. 3. is the schematic for the portable unit pulse duration interface section.

Figure 4:
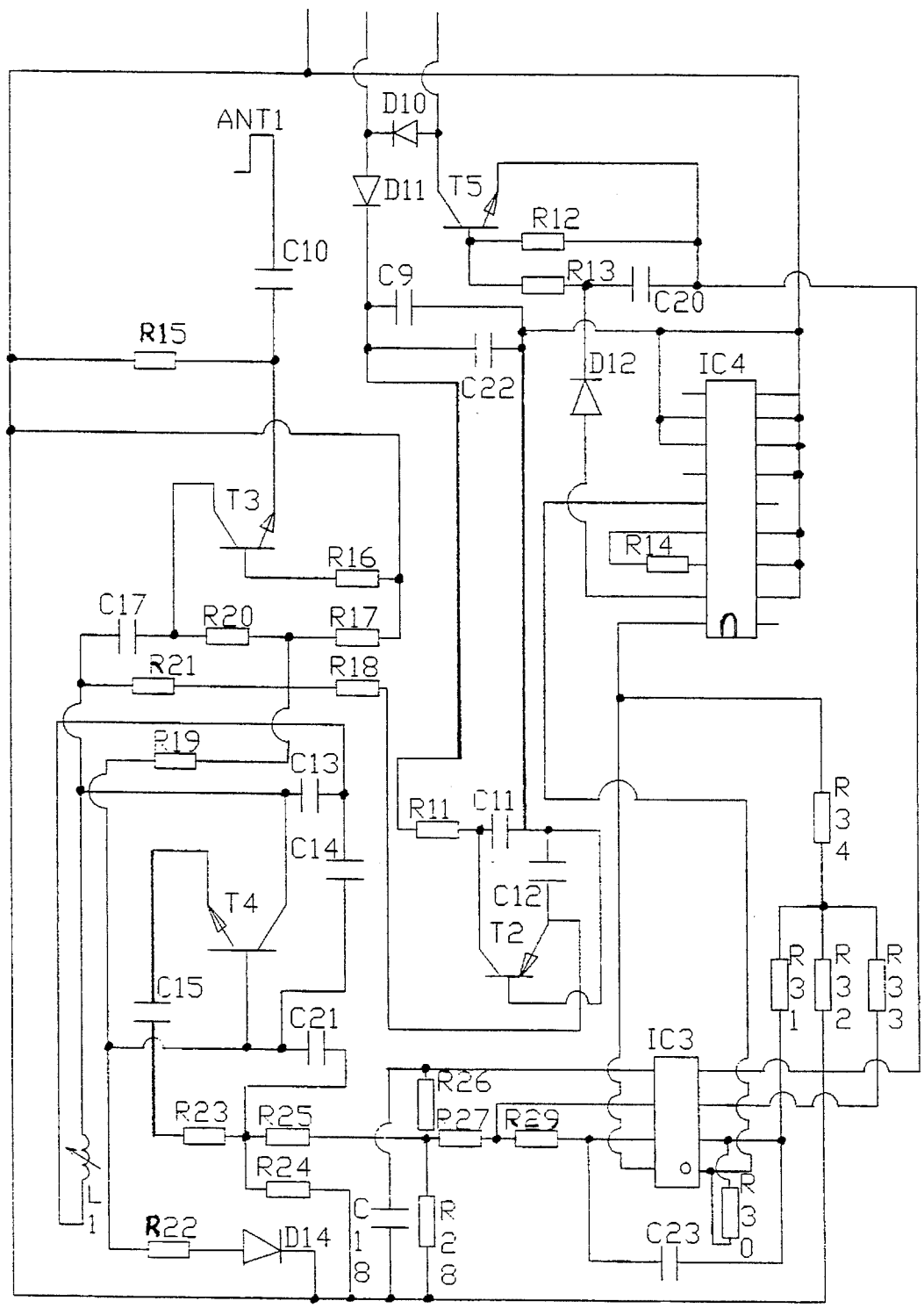

FIG. 4. is the schematic for the central unit receiver section.

Figure 5:
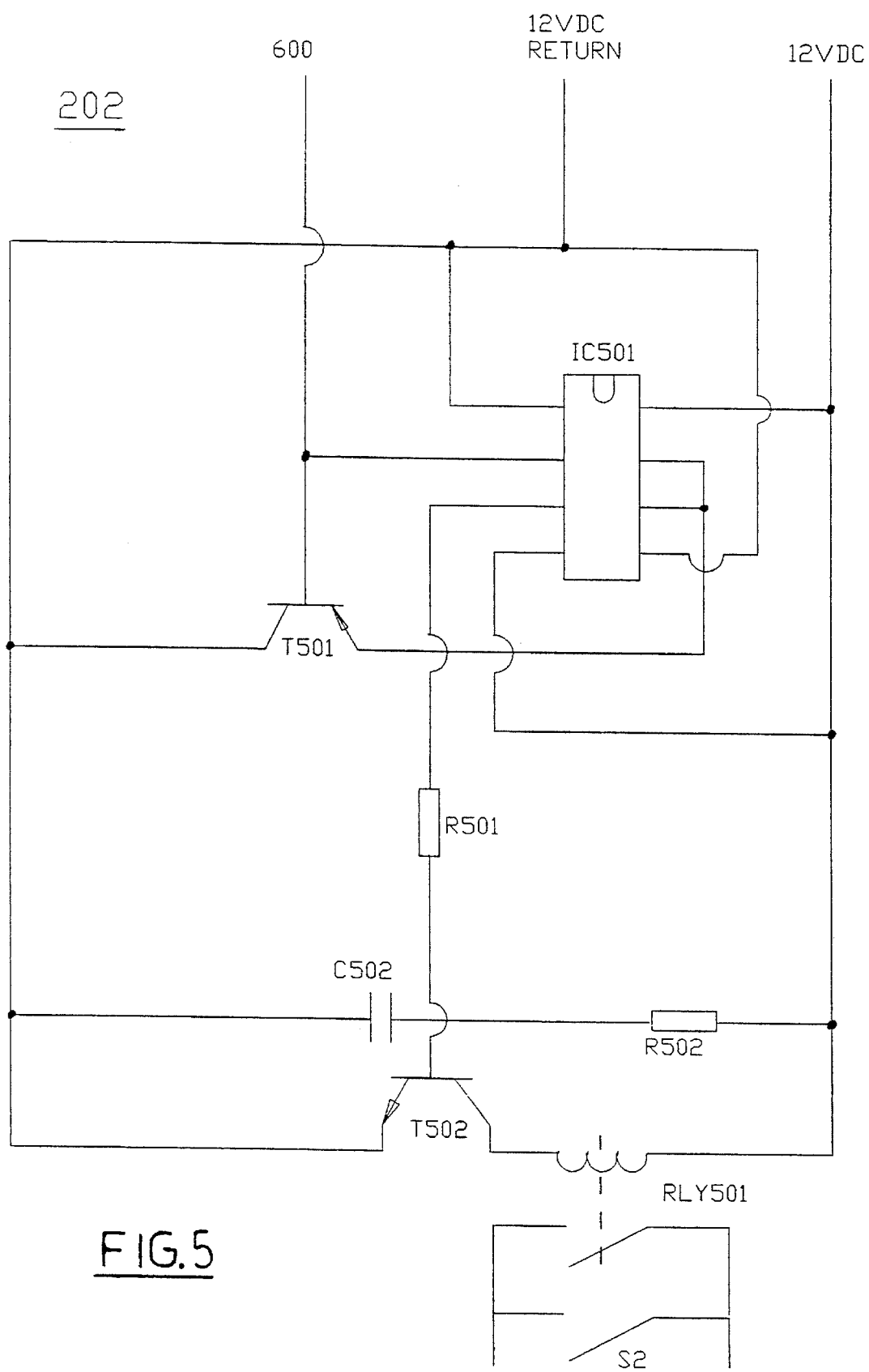

FIG. 5. is the schematic for the central unit interface section.

FIG. 6. is a typical operation time chart.

| Reference Numerals In Drawings | |
| --- | --- |
| R1 | 2 OHMS |
| R2 | 100K OHMS |
| R3 | 47 OHMS |
| R4 | 2.5 MEG OHMS |
| R5 | 1K OHMS |
| R6 | 1K OHMS |
| R7 | 14.7 MEG OHMS |
| R8 | 470K OHMS |
| R11 | 47 OHMS |
| R12 | 33K OHMS |
| R13 | 22K OHMS |
| R14 | 75K OHMS |
| R15 | 220 MEG OHMS |
| R16 | 10K OHMS |
| R17 | 33K OHMS |
| R18 | 100 OHMS |
| R19 | 100K OHMS |
| R20 | 1K OHMS |
| R21 | 6.7K OHMS |
| R22 | 40K OHMS |
| R23 | 1 OHM |
| R24 | 6.7K OHMS |
| R25 | 17K OHMS |
| R26 | 100K OHMS |
| R27 | 100K OHMS |
| R28 | 1K OHMS |
| R29 | 6.7 MEG OHMS |
| R30 | 6.7 MEG OHMS |
| R31 | 470K OHMS |
| R32 | 17K OHMS |
| R33 | 100K OHMS |
| R34 | 17K OHMS |
| R501 | 6K OHMS |
| R502 | 12 MEG OHMS |
| C1 | 3.3 PICO FARADS |
| C2 | 3.3 PICO FARADS |
| C3 | 0.001 MICRO FARADS |
| C4 | 8.2 PICO FARADS |
| C5 | 0–10 PICO FARADS |
| C6 | 1 MICRO FARAD |
| C9 | 10 PICO FARADS |
| C10 | 100 PICO FARADS |
| C11 | 10 PICO FARADS |
| C12 | 10 PICO FARADS |
| C13 | 8.2 PICO FARADS |
| C14 | 390 PICO FARADS |
| C15 | 3.3 PICO FARADS |
| C16 | 3.3 PICO FARADS |
| C17 | 3.3 PICO FARADS |
| C18 | 1 PICO FARAD |
| C19 | 1 PICO FARAD |
| C20 | 10 MICRO FARADS |
| C21 | 390 PICO FARADS |
| C22 | 0.1 MICRO FARADS |
| C23 | 0.1 MICRO FARADS |

-continued

| Reference Numerals In Drawings | |
|---|---|
| C501 | 0.01 MICRO FARADS |
| C502 | 3 MICRO FARADS |
| D1 | 1N914 |
| D2 | 1N914 |
| D10 | 1N4002 |
| D11 | 1N4002 |
| D12 | 1N914 |
| D14 | 1N4002 |
| LED1 | HLMP 1000 |
| L1 | .046–.055 MICRO H |
| T1 | C2668 |
| T2 | A32D |
| T3 | MPSH10 |
| T4 | MPSH10 |
| T5 | A13 |
| T501 | A13 |
| T502 | 2N2222 |
| IC1 | VD5012 |
| IC2 | NE555 |
| IC3 | 2904D |
| IC4 | VD5014 |
| IC501 | NE555 |
| OS1 | MDC3010 |
| RLY1 | MAGNADYNE ALA984 |
| S1 | 2P3T OFF-ON-MOMENTARY |
| S2 | SPST |

DESCRIPTION OF DRAWINGS: FIGS. 1–5

FIG. 1 is a block diagram which depicts the entire system. The system consists of 4 main parts, the transmitter (101) and the pulse duration interface (102), which make up the portable unit, and the receiver (201) and the central unit interface (202), which make up the central unit. Block 101 of the system, the transmitter, consists of the following parts: R1,C1,C2,R2,T1,R3,C3,C4,C5, AND ANT2. These parts make up a typical oscillator section were R1 is used to regulate the power output and C5 is utilized to manually tune the oscillator to the proper frequency.

IC1 and R4 make up the circuit which encodes the oscillator signal. Diodes D1 and D2 are utilized to pass the output signal to the pulse duration interface (102). Switch S1 energizes and deenergizes the entire portable unit. Switch S1 when placed in the momentary position initiates a pulse transmission.

The pulse duration interface unit (102) consists of OS1, R5,R6,R7,R8, C2,C6 and LED 1. Line 300 from the transmitter (101) supplies power to IC2. IC2 is a timer device which supplies a square wave output. The duration of the output and the time delay between outputs is adjusted by R7,R8 and C6. The out put is used for control of OS1, which is an optical switch. When OS1 receives this signal, it allows the transmitter circuit (101) to generate a signal by completing the transmitter circuit through line 100. LED1 is a visual indication that the unit is in an active transmission state.

The receiver (201) of FIG. 4 is a classic 4 stage superregenerative receiver tuned to the same frequency as the transmitter (101).

R11,C11,C12,T2,C22,C10,D11 and C9 provide the power regulation for the central unit.

The amplification stages, consisting of the components ANT1,C10,R15,R16,R17,R20,C17,L1,T3 and R21 make up the input LC filter which resonates at the transmitter frequency. L1 is utilized for tuning the circuit.

The receiver stage comprises T4,C13,C14,R19,C15,R22, R23, R24,R25,D14 and R18.

The amplification/demodulation is accomplished through IC3,C18,C23,R30,R31,R32,R33,R26,R27,R28 and R29. R26,R27,R28 and R29 determine the threshold level and is kept constant by C18.

The signal is sent to IC4 and if the encoded signal matches that of the transmitter, a signal is then sent to switch transistor T5 and its circuitry. This signal is then passed to the central unit interface (202) via line 600.

The central unit interface (202) receives the signal from line 600 and processes it through T501 and IC501, which is a pulse detector. IC501 holds its signal high for a duration of time set by C502 and R502. Each time a signal is passed to IC501 from line 600, IC501 is reset and its time duration set to zero.

IC501 transmits a signal to T502 which is used to energize or deenergize the relay coil. The contacts of RLY501 are connected to the vehicle's electrical system and is utilized to enable and disable the electrical system.

Switch S2 is utilized to bypass the electrical system disabling circuit.

Operation: FIGS. 1–6

The portable unit consisting of the transmitter (101) and the pulse duration interface (102) is carried by the vehicle operator. When the operator approaches the vehicle, the operator energizes the portable unit by placing switch S1 to the momentary position then releasing it to the on position. The pulse duration interface (102) begins enabling the transmission of a signal produced by the transmitter. The time characteristics of this signal are determined by the pulse duration time and time between pulses set in the pulse duration interface unit (102).

If the portable unit is within range of the central unit, which consists of the receiver (201) and the central unit interface (202), the central unit, which is always energized by the automobile battery, receives the signal and energizes relay RLY501. The normally open contacts of this relay then close, allowing the automotive electrical system to properly function.

If the portable unit is deenergized by S1 or becomes out of range of the receiver, the central unit interface pulse detector will time out and deenergize relay RLY501, thus disabling the automotive electrical system.

FIG. 6 is a time history chart presented for better clarification. At point A switch S1 is closed and the portable unit transmitter (101) begins generating a pulsed signal. This signal is received by the central unit receiver (201) and processed through the central unit interface (202) which in turn enables relay RLY501. The normally open contacts of RLY501 close, enabling the vehicles electrical system. The vehicle's electrical system remains enabled until the receiver (201) ceases to receive the signal from the portable unit (point B). The central unit pulse interface pulse detection circuit commences to time out after the last pulse received. If a pulse is not received within the preset time, relay RLY501 deenergizes and the automotive electrical system becomes disabled (point C).

SUMMARY, RAMIFICATIONS, AND SCOPE

Accordingly, the reader will see that this invention has a number of advantages over previous inventions. Some of these advantages are:

the device will function continuously to constantly protect the vehicle.

the proximity of the portable unit to the vehicle mounted unit is changed from a liability to an asset.

the device will function automatically and independently of the vehicle operator.

Although the description above contains many specifications, these should not be construed as limiting the scope of the invention but as merely providing illustrations of some of the presently preferred embodiments of this invention.

For example, the portable unit can have various shapes and sizes to best take advantage of concealability and ease of transport; the portable unit power recharging can be accomplished in the home or automobile with various battery rechargers; a bypass circuit can be added to disable the device; the device can utilize any number or types of transmittable signals, etc.

It can further be noted that the transmitter and receiver of this embodiment are typical circuits of which there are numerous variations. The transmitter and receiver sections of these circuits are detailed for clarification of the entire embodiment. It is clear that the unique features of this embodiment consist of the addition of the pulse duration interface to the transmitter as well as the central unit interface to the receiver.

Thus the scope of the invention should be determined by the appended claims and there legal equivalents, rather than by the examples given.

We claim:

1. A security device capable of integration with a self-propelled vehicle and operative to disrupt the propulsion of said vehicle, comprising:

(a) a transmitter of limited range carried by the operator of said vehicle producing a coded broadcast signal pulse of selected frequency and duration, with a time delay of selected duration between pulses; the transmitter comprising oscillator means, means to regulate power output, means to manually tune the oscillator means to a desired frequency, signal encoding means, plural diodes to pass an output signal to a pulse duration interface switch means for turning the transmitter on/off, the pulse duration interface switch means comprising timer means for supplying a square wave output, means for adjusting a time delay period, and LED means for visually indicating that the transmitter is actively transmitting;

(b) a receiver, located in the vehicle, receiving pulsed signals from the transmitter unit and converting those pulsed signals to a continuous signal; the receiver comprising power regulation means, amplification means, LC filter means resonating at the transmitter frequency, receiver tuning means, demodulation means, and means for determining if a received encoded signal matches a transmitter signal;

(c) an interface unit, integrated with the vehicle propulsion system, disabling said vehicle propulsion system in the event a transmitted signal is not received from the transmitter after a predetermined time duration;

the interface unit comprising pulse detector processing means, and means for energizing and de-energizing a relay coil to enable and disable the vehicle's electrical system.

* * * * *